June 1, 1965   J. M. FOSTER, JR   3,187,158
DEVICE FOR USE IN ARC WELDING
Filed Aug. 28, 1962
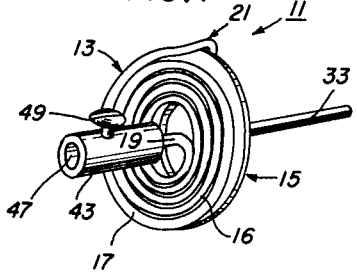
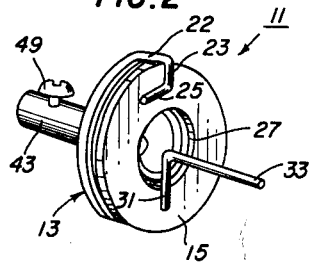
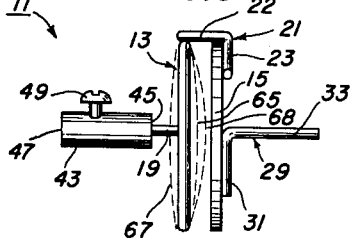
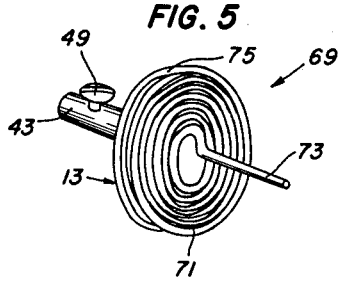
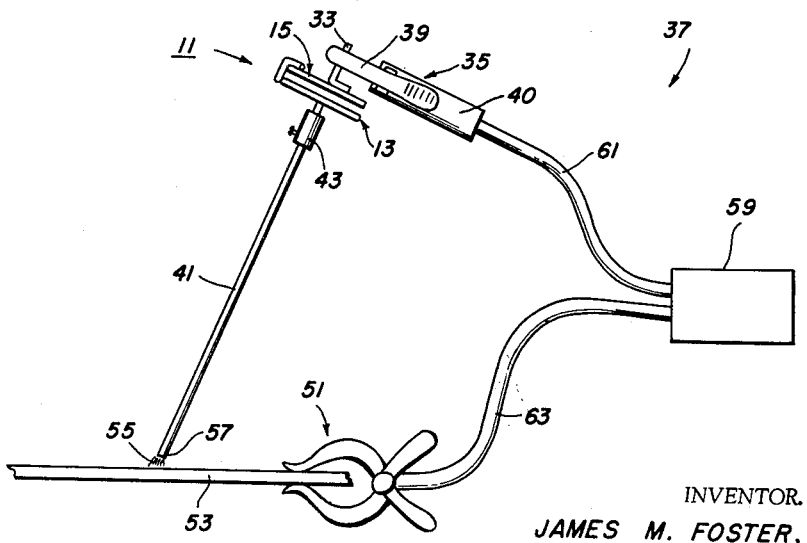
INVENTOR.
JAMES M. FOSTER, JR.
BY John R. Walker, III
Attorney

United States Patent Office 3,187,158
Patented June 1, 1965

3,187,158
DEVICE FOR USE IN ARC WELDING
James M. Foster, Jr., 141 N. Highland, Memphis, Tenn.
Filed Aug. 28, 1962, Ser. No. 220,004
4 Claims. (Cl. 219—130)

This invention relates to a device for use in arc welding.

The usual means of manual welding is by the use of a welding rod which is attached to the electrode holder which leads from a suitable source of electricity and with the ground clamp leading from the source of electricity being clamped onto the work piece. The welding rod is brought down to the work piece or metal to be welded, which starts melting, and also the end of the welding rod begins to melt. The rod is then drawn back away from the metal and the arc starts to form, and it continues to melt the rod and metal together. The rod actually melts faster than the work piece so that the metal from the rod is deposited and forms the weld. In performing the previous or usual type of welding above described, it will be understood that it takes a great deal of skill to strike the arc and then maintain the end of the welding rod at the proper distance from the work piece. This is particularly so when welding irregular surfaces in which case the welder has difficulty judging the irregularities in the surface. For example, when the work piece contains a protrusion, it, in effect, reduces the arc gap between the welding rod and the work piece, thereby increasing the current flow and causing more metal to be deposited. Also, in a case like this, there is a danger of the end of the welding rod actually touching the protrusion to short the circuit and cause the rod to stick onto the surface. With the other extreme, that is, when depressions in the metallic surface are encountered, the arc gap is increased, the amount of current drawn in decreased, there is less welding metal deposited, and there is a danger of the arc becoming extinguished. From the foregoing it will be understood that it requires a great deal of time to teach a person to weld effectively and, even at best, a perfect job cannot be obtained because of the variations in the surface of the metal, as heretofore described, and other variations such as variations in current, etc.

Thus, the present invention is directed towards overcoming the above mentioned and other disadvantages inherent in manual arc welding.

Therefore, one of the objects of the present invention is to provide a device for use in arc welding which responds to differences in welding conditions much quicker than a welder could respond manually.

A further object is to provide such a device that is very sensitive to such changes and conditions and will immediately compensate for these variations.

A further object is to provide such a device that will start the arc automatically.

A further object is to provide such a device which automatically moves the rod away from and towards the metal being welded to maintain the proper spacing for efficient welding.

A further object is to provide such a device that performs a neater weld which is smooth and has no lumps, which otherwise might occur with the conventional manual welding.

A further object is to provide such a device that makes possible an efficient welding job by persons who have little or no experience, thereby reducing the cost of welding to industry because a lower paid worker can be used to do the same job previously done by higher paid workers.

A further object is to provide a unique device that is economical to manufacture, particularly as compared with previous automatic machine-type welders.

A further object is to provide such a device that can be used with a welding machine of poorer quality, that is, one which does not maintain a constant current, and yet with such a machine an efficient welding job can be performed since the device of the present invention tends to maintain substantially a constant current.

A further object is to provide such a device which is particularly effective in welding surfaces that have irregularities therein.

The means by which the foregoing and other objects of the present invention are accomplished and the manner of their accomplishment will be readily understood from the following specification upon reference to the accompanying drawings, in which:

FIG. 1 is a perspective view of the preferred form of the device of the present invention.

FIG. 2 is a view similar to FIG. 1 of the same device only viewed from the opposite side thereof.

FIG. 3 is a side elevational view of the device of the present invention.

FIG. 4 is a somewhat schematic view showing the device of the present invention in use with the usual welding apparatus.

FIG. 5 is a view similar to FIG. 2 of a modified form of the present invention.

Referring now to the drawings in which the various parts are indicated by numerals, the device 11 of the present invention comprises in general a pair of substantially circular members 13 and 15. In the preferred embodiment shown in FIGS. 1–4, member 13 is preferably in the form of a coil 16 of spirally-wound wire 17, which is of any suitable material that will conduct electricity, such as aluminum, copper, bronze or the like. It should be noted that the turns of coil 16 are spaced apart, or otherwise suitably insulated. Wire 17 terminates at one end at an inner end 19 that extends substantially perpendicularly relative to coil 16 and extends substantially along the axis thereof. In addition, wire 17 terminates at the opposite end thereof in an outer end 21 that extends generally in the opposite direction from inner end 19 for a portion as at 22 and thence is bent downwardly as at 23 and laterally as at 25, which portions 23, 25 are connected by suitable means as soldering or the like to member 15.

Member 15 in the preferred embodiment is preferably in the form of a substantially flat ring having a central opening 27 therein and is formed of a metal, such as a ferro-magnetic material, that will be attracted by the magnetic force of coil 16.

Member 15 is in spaced parallel relationship with member 13 and preferably co-axially aligned therewith. A piece of wire 29, formed of an electrical conducting material and having a portion 31, is fixedly attached to member 15 at portion 31 by means of soldering or the like. Portion 31 extends inwardly towards the center of member 15 and is then bent substantially perpendicularly outwardly therefrom for a portion 33 which extends substantially along the axis of members 13, 15, in line with inner end 19 of member 13 but in the opposite direction therefrom, so that means is provided for holding device 11. Thus, as shown in FIG. 4, electrode holder 35 of the usual welding apparatus 37 is provided with the usual clip 39 which clamps on or grasps portion 33, and the welder holds the device by the usual handle 40. In other words, the portion 33 is grasped, in the use of the present invention, in the same manner in which it is customary to grasp the welding rod in the conventional welding method. In the present invention, the usual welding rod 41 is coupled to device 11 by suitable means which preferably comprises a tubular member 43 having its inner end 45 fixedly attached to inner end 19 of coil 13, as by soldering or the like, and in such a manner that the tubular member 43 extends outwardly from inner end 19 substantially along the axis of members 13, 15. One end of welding rod 41 is inserted in the outer end 47 of tubular member 43 and is removably held therein by a set screw 49 extending through a threaded aperture in tubular member 43 and contacting the rod to hold it in place. From the foregoing it will be understood that when device 11, welding rod 41, and electrode holder 35 are interconnected as above described, welding rod 41, member 43, end 19, and portion 33 will be substantially in alignment along an axis, and members 13 and 15 will be disposed in spaced parallel relationship substantially in planes that are substantially perpendicular to said axis.

In using the device 11 of the present invention, welding rod 41, device 11, and electrode holder 35 are interconnected, as heretofore described. The ground clamp 51 is clamped onto the metal to be welded or workpiece 53 in the usual manner. It will be understood that with the arc 55 formed between the distal end 57 of welding rod 41 and workpiece 53, the welding circuit will be completed from the welding machine, shown in block diagram as at 59, which is of usual construction and includes a source of electricity, preferably D.C. Said welding circuit is traced as follows: conductor 61 leading from machine 59 to electrode holder 35, device 11, welding rod 41, arc 55, workpiece 53, ground clamp 51, and conductor 63 which leads from the ground clamp 51 back to the machine 59. With the distal end 57 of rod 41 at a proper and given distance from workpiece 53 and with a given current flow through the welding circuit, a balanced condition will exist between the magnetic force of coil 16 urging the members 13, 15 together and the spring means of member 13. It will be understood that this spring means or resiliency exists due to the configuration of member 13. For the purpose of explaining this, let us assume that member 15 is held stationary and, as viewed in FIG. 3, inner end 19 is displaced either to the left or to the right from its normal static position, shown in solid lines in this figure. Then, when inner member 19 is released from such a displaced position, the inner member will return to its static condition. Also, it will be understood that the major movement of coil 16 is adjacent the center thereof since the outside turns are held somewhat stationary by means of the outer end 21 being attached to member 15, which, in the example, was considered to be held stationary. In other words, when inner end 19 is displaced inwardly towards member 15, it will assume a concave position, as best seen in dotted lines in FIG. 3, which position also, for purposes of clarity, will be denoted the balanced position 65. By the same token, when inner end 19 is displaced outwardly away from member 15, it will be understood that member 13 will assume a convex position, with one such position being shown in dotted lines as at 67 in FIG. 3. Thus, it will be understood that the balanced position 65 will be the position of the coil 16 when the proper distance of the welding rod 41 from the workpiece 53 with a given current is obtained. In this balanced position 65, the resiliency which is attempting to urge the inner end 19 to the left, as viewed in FIG. 3, is balanced against the magnetic force tending to draw the members 13, 15 together. It will be understood that there would be an increase in the current in the welding circuit above the given amount heretofore mentioned if there were a decrease in the resistance in the circuit, as would occur if the gap between welding rod 41 and workpiece 53 were reduced. Thus, if the welder moved electrode holder 35 down towards workpiece 53, or if there was a protrusion on the upper surface of workpiece 53 to effectively decrease the gap, then there would be a momentary increase in the current which would cause an increase in the magnetic attraction of members 13, 15, due to an increased current flowing through coil 16, and would move coil 16 to a position such as that shown in dotted lines as at 68, which would draw rod 41 back away from workpiece 53 and prevent the rod from sticking to the workpiece. Referring now to the opposite condition, it will be understood that there would be a decrease in the current in the welding circuit below the given amount heretofore mentioned if there were an increase in the resistance in the circuit, as would occur if the gap between welding rod 41 and workpiece 53 were increased. Thus, if the welder moved electrode holder 35 away from workpiece 53, or if there were a concave portion on the upper surface of workpiece 53 to effectively increase the gap, then there would be a momentary decrease in the current which would cause a decrease in the magnetic attraction of members 13, 15, due to a decreased current flowing through coil 16, and would move coil 16 to a position to the left, as viewed in FIG. 3, of the balanced position 65, which would move rod 41 towards workpiece 53 and prevent the arc from going out.

From the foregoing it will be understood that the device 11 of the present invention is very sensitive to changes and conditions and will immediately compensate for such variations. For example, if a drop or glob of metal comes in the way of the welding, ordinarily with previous devices the welding rod would have a tendency to stick to the workpiece, but with the present device 11 the welding rod 41 responds immediately, jumps back away from the glob of metal, and does not stick to the workpiece 53. Also, if the arc starts to go out, the present device 11 will cause the welding rod 41 to jump towards the workpiece 53 and many times will start its own arc.

A modified form of the present invention is shown in FIG. 5, in which it will be seen that the modified device 69 is substantially the same as device 11 except that member 71 is in the form of a coil rather than a ring, as is the case of member 15. In other words, both members in device 69 are coils. In the modified device 69, member 13 is the same as member 13 of the preferred device 11, and wire 17 is merely continued on over into member 71 where it is spirally wound towards the center of member 71, and thence the end 73 of the wire is projected outwardly and corresponds to portion 33 of device 11. Member 71 is also preferably flat and spaced apart, in the same manner as member 15, from member 13, with the members being connected by the portion 75 of the wire. In addition, device 69 is used in the same manner as device 11, and further explanation of its operation is not deemed necessary.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. A device for use with arc welding equipment comprising a pair of substantially flat and parallel spaced members, means on one of said members for coupling said one of said members to the arc welding equipment, means on the other of said members for coupling said other of said members to a welding rod, resilient means urging said members apart, at least one of said members comprising substantially flat spirally-wound coil means for magnetically attracting the other of said members to urge said members towards one another against the force of said resilient means when current is passed therethrough.

2. The combination with arc welding equipment of the type including a source of electricity, a first electrical conductor leading from said source of electricity, a second electrical conductor leading from said source of electricity, and means coupling said second electrical conductor to a workpiece; of a device comprising a pair of substantially flat and parallel spaced members, means coupling one of said members and said first electrical conductor, means attached to the other of said members for coupling said other of said members to a welding rod, resilient means urging said members apart, at least one of said members comprising substantially flat spirally-wound coil means for magnetically urging said members towards one another against the force of said resilient means when current is passed therethrough.

3. The combination in an arc welding circuit including a source of electricity, a first electrical conductor leading from said source of electricity, a second electrical conductor leading from said source of electricity, and means coupling said second conductor to a workpiece; of a device comprising a first substantially flat and spirally-wound coil having an inner end and an outer end, a second substantially flat and spirally-wound coil having an inner end and an outer end, said coils being integrally joined adjacent the outer ends thereof with the major portions of said coils being spaced apart in co-axial alignment, at least one of said coils being resilient whereby any force urging displacement of said one of said coils from a static position is opposed by the resiliency of said one of said coils urging said one of said coils to said static position, said coils being magnetically attracted to each other when current flows therethrough, means coupling said first coil to said first electrical conductor, means coupling said second coil to a welding rod, said coils being in said welding circuit, said coils being responsive to a normal flow of current therethrough when said rod is at a proper distance from said workpiece to maintain a balanced condition of the magnetic attraction thereof and the resiliency of said one of said coils and with said spacing between said members being maintained at a given amount less than the initial static spacing of said coils, said coils being responsive to an increase in current through said coils caused by said rod being too close to said workpiece to magnetically attract said coils and increase the distance between the end of said rod and said workpiece, and said coils being responsive to a decrease in current through said coils caused by said rod being too far from said workpiece to permit the resiliency of said one of said coils to urge said other of said coils away from said one of said coils and decrease the distance between the end of said rod and said workpiece.

4. The combination in an arc welding circuit including a source of electricity, a first electrical conductor leading from said source of electricity, a second electrical conductor leading from said source of electricity, and means coupling said second conductor to a workpiece; of a device comprising a substantially flat and spirally-wound coil having an inner end and an outer end, a ferro-magnetic ring, means joining said coil adjacent the outer end thereof to said ring with said ring and said coil being spaced and substantially co-axially aligned, said coil being resilient whereby any force urging displacement of said coil from a static position is opposed by the resiliency of said coil urging said coil to said static position, said coil magnetically attracting said ring when current flows therethrough, means coupling said ring to said first electrical conductor, means coupling said coil to a welding rod, said coil being in said welding circuit, said coil being responsive to a normal flow of current therethrough when said rod is at a proper distance from said workpiece to maintain a balanced condition of the magnetic attraction thereof and the resiliency of said coil and with said spacing between said members being maintained at a given amount less than the initial static spacing of said coil and said ring, said coil being responsive to an increase in current therethrough caused by said rod being too close to said workpiece to magnetically attract said coil towards said ring and increase the distance between the end of said rod and said workpiece, and said coil being responsive to a decrease in current therethrough caused by said rod being too far from said workpiece to permit the resiliency of said coil to urge said coil away from said ring and decrease the distance between the end of said rod and said workpiece.

References Cited by the Examiner
UNITED STATES PATENTS

| 1,128,116 | 2/15 | Dralle | 219—125 |
| 1,284,529 | 11/18 | Woltmann | 219—124 |

RICHARD M. WOOD, *Primary Examiner.*

JOSEPH V. TRUHE, *Examiner.*